(12) United States Patent
Jia et al.

(10) Patent No.: US 12,135,753 B2
(45) Date of Patent: Nov. 5, 2024

(54) SOFTWARE DEFINED METAVERSE PERSONALITY AS A SERVICE

(71) Applicant: AT&T Intellectual Property I, L.P., Atlanta, GA (US)

(72) Inventors: Yupeng Jia, South Pasadena, CA (US); Hongyan Lei, Plano, TX (US); Venson Shaw, Kirkland, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/985,270

(22) Filed: Nov. 11, 2022

(65) Prior Publication Data

US 2024/0160676 A1    May 16, 2024

(51) Int. Cl.
| | | |
|---|---|---|
| *G06F 15/16* | (2006.01) | |
| *G06F 3/01* | (2006.01) | |
| *G06F 16/9535* | (2019.01) | |
| *H04L 67/50* | (2022.01) | |
| *H04L 67/306* | (2022.01) | |

(52) U.S. Cl.
CPC .......... *G06F 16/9535* (2019.01); *G06F 3/011* (2013.01); *H04L 67/535* (2022.05); *H04L 67/306* (2013.01)

(58) Field of Classification Search
CPC . H04L 67/535; H04L 67/306; G06F 16/9535; G06F 3/011
See application file for complete search history.

(56) References Cited

U.S. PATENT DOCUMENTS

| | | | | |
|---|---|---|---|---|
| 2009/0158150 A1* | 6/2009 | Lyle | ........................ | A63F 13/79 |
| | | | | 715/706 |
| 2011/0029889 A1* | 2/2011 | Karstens | .................. | A63F 13/35 |
| | | | | 715/745 |
| 2020/0311993 A1* | 10/2020 | Dowlatkhah | ........... | H04W 4/02 |
| 2021/0360294 A1* | 11/2021 | Liao | ..................... | H04L 41/5019 |
| 2023/0315243 A1* | 10/2023 | Mossoba | ............... | G06F 16/958 |
| | | | | 715/764 |
| 2023/0350487 A1* | 11/2023 | Tan | ......................... | G06F 3/011 |
| 2024/0161412 A1* | 5/2024 | Jia | ............................ | G06F 3/014 |

* cited by examiner

*Primary Examiner* — Oleg Survillo

(74) *Attorney, Agent, or Firm* — Guntin & Gust, PLC; Ralph Trementozzi

(57) ABSTRACT

Aspects of the subject disclosure may include, for example, providing immersive media to a computing device over a network utilizing a first network slice, a first spectrum resource allocation, and/or a first RAT; obtaining a metaverse profile associated with the user, which includes information defining or associated with user capabilities and content presentable in the immersive media; processing or initiating a different network slice, a different spectrum resource allocation, and/or a different RAT based on the metaverse profile; and continuing providing the immersive media to the computing device. Other embodiments are disclosed.

20 Claims, 8 Drawing Sheets

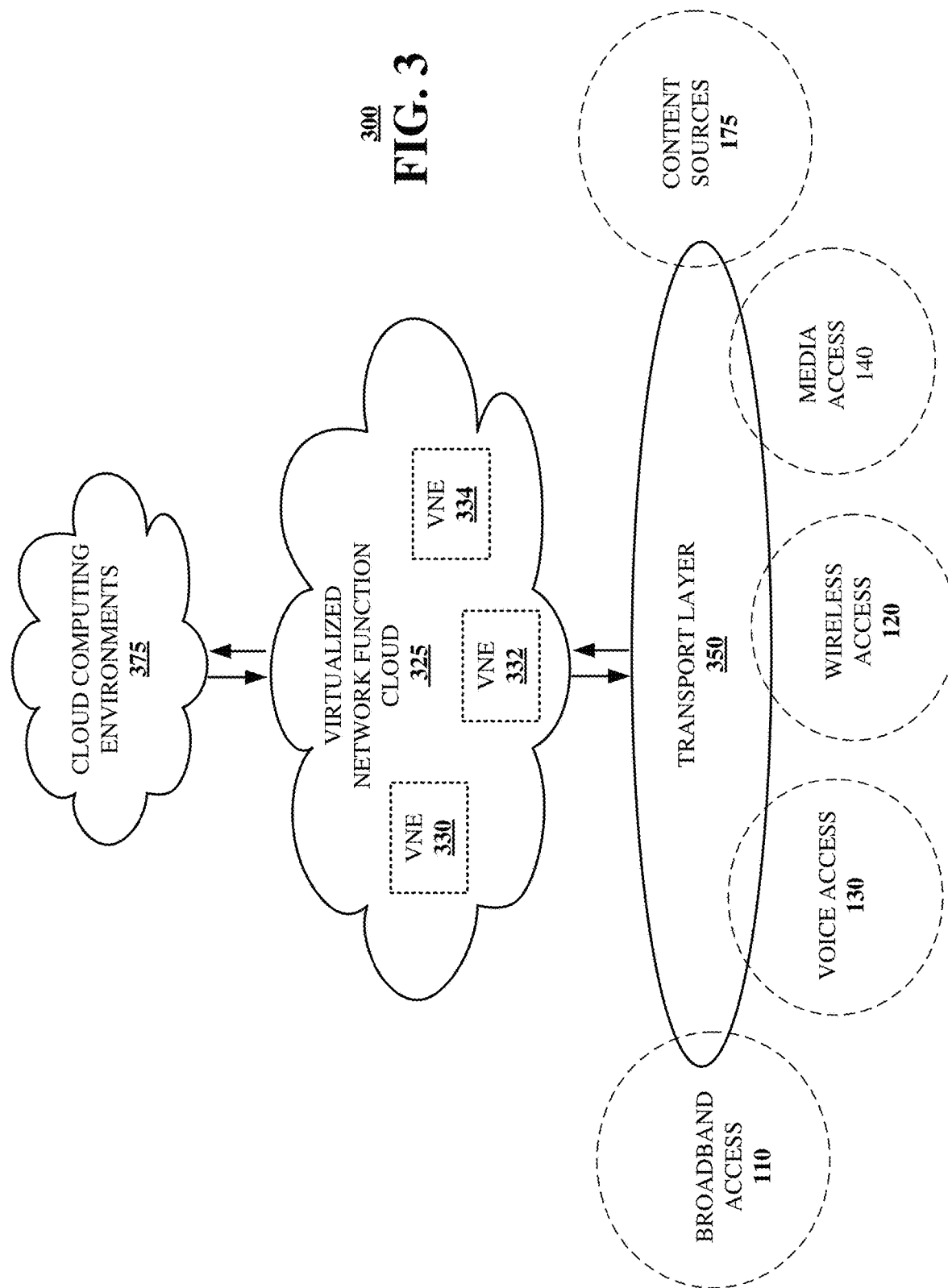

SOFTWARE DEFINED METAVERSE PERSONALITY AS A SERVICE

FIELD OF THE DISCLOSURE

The subject disclosure relates to software defined metaverse personality as a service.

BACKGROUND

Metaverse has been viewed as the next generation digital user experience, including virtual workspace, health care, entertainment, and so forth. There are multiple options to connect to the metaverse, such as via a personal computer, smartphone, virtual reality device, augmented reality device, and so forth, which can provide 2D, 3D . . . xD immersive connection experiences.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
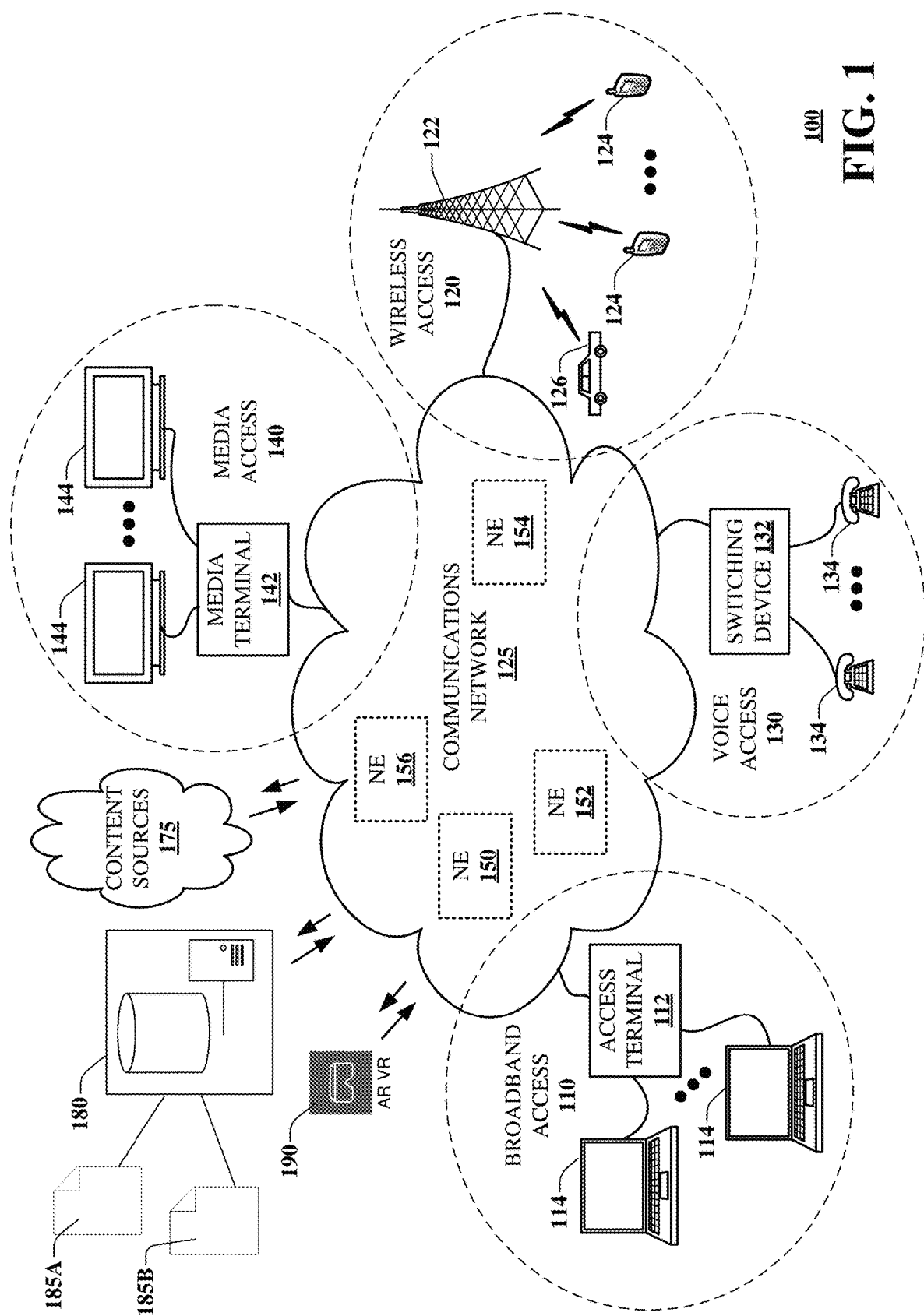
FIG. 1 is a block diagram illustrating an exemplary, non-limiting embodiment of a communications network in accordance with various aspects described herein.

The subject disclosure describes, among other things, illustrative embodiments for managing metaverse experiences through use of metaverse profiles. In one or more embodiments, creating, switching, and/or terminating one or more metaverse profiles to manage or otherwise facilitate providing immersive media (e.g., a persistent or temporary metaverse world or other interactive communication services) can be provided to a user(s). In one or more embodiments, the methods and systems can dynamically prepare a new (target) metaverse profile(s) in advance or otherwise prior to a particular event or time period through network slicing. In one or more embodiments, the methods and systems can dynamically prepare a new (target) metaverse profile(s) in advance or otherwise prior to a particular event or time period through network spectrum resource allocation. In one or more embodiments, the methods and systems can dynamically prepare a new (target) metaverse profile(s) in advance or otherwise prior to a particular event or time period through a separate or different network radio technology.

In one or more embodiments, the methods and systems can provide real-time switching of the metaverse profile(s) based on various factors, including user(s)'s needs or expectations. In one or more embodiments, the methods and systems can provide switching of the metaverse profile(s) triggered by a user(s)'s instructions (e.g., voice, facial cue, eyeball movement, gesture, etc.) or according to monitored/detected behavior of the user (or of other users in the immersive experience), such as a machine learning model being applied to a specific user(s)'s habits or behavior. In one or more embodiments, the methods and systems can manage the metaverse profile(s) so as to build a metaverse responsibly, such as releasing a metaverse profile(s) naturally. In one embodiment, autonomic principles can be employed for system management and orchestration in order to give the user(s) the option to have physical world root ID controls over the virtual world profiles.

In one embodiment, the methods and systems can provide or create a feedback loop or mechanism to analyze the metaverse profile(s) and/or the immersive experience of the user(s), such as determining that a particular metaverse profile caused a user to feel uncomfortable, which can be utilized in the future for the user to improve the creation, switching, and/or termination of particular metaverse profiles.

In one embodiment, the methods and systems can provide for grouping of metaverse profiles for a single user or for a group of users which can then be utilized to create a metaverse social personality as a service. As an example, multiple metaverse profiles can be selected for a communication session of a particular user and those profiles can be aggregated or merged to generate another metaverse profile, which can be used to provide at least some of the user capabilities and/or content associated with the multiple metaverse profiles during the session. In one embodiment, this new or aggregated metaverse profile can be stored for future use by the user (or other users).

In one embodiment, the methods and systems can be scaled up or otherwise adjusted, particularly as metaverse technologies mature or improve including in a mixed physical and virtual world. In one embodiment, the methods and systems can provide a smooth or seamless transition between different multi-modal metaverse profiles (e.g., personalities), which can be based on various factors such as real-time identification of needs or desires. In one embodiment, a transition between one or more of a work mode, an entertainment mode, an online learning mode, or other user modes can be implemented through a smooth/seamless/fast transition amongst multi-modal metaverse profiles without frequent swapping the gears or skip loading the metaverse applications or software, which will greatly improve the metaverse or immersive media user experience.

In one or more embodiments, a single or multiple metaverse profiles (e.g., applied/employed in series and/or applied/employed in parallel) can be utilized to provide a metaverse or other digital experience which can include a set of technologies that combine to create an immersive experience for one or more users. In one embodiment, the immersive experience may occur in a persistent virtual world that continues to exist even after a user(s) has left the virtual world. In one embodiment, immersive media can be presented at an end user device(s) which can include content presented to a user(s) from a first-person perspective, and which can provide the illusion that the user(s) is present within the content rather than observing the content from the outside. In one embodiment, a metaverse can be provided that is one type of immersive experience which can be an extensive, shared, interactive, always-on virtual world, such as with a fully functioning economy that operates in real time. In one or more embodiments, the single or multiple metaverse profiles (e.g., applied/employed in series and/or applied/employed in parallel) can be applicable to other digital environments, immersive experiences, media, and so forth, whether persistent or temporary (including constructed and torn down by the user(s)).

In one or more embodiments, the immersive media or metaverse world(s) can be created using immersive reality (IR), augmented reality (AR), virtual reality (VR), mixed reality (MR) and/or extended reality (XR). In one or more embodiments, the components, concepts and techniques described herein may be extended to all similar or related technologies. In some examples, immersive media or a metaverse experience can include an online or digital economy where users can create, buy and sell goods and services. Other embodiments are described in the subject disclosure.

One or more aspects of the subject disclosure include a device, comprising: a processing system including a processor; and a memory that stores executable instructions that, when executed by the processing system, facilitate performance of operations, the operations comprising: providing immersive media for presentation by an end user device of a user, wherein the providing the immersive media is according to a first metaverse profile of the user that includes first information associated with first user capabilities and first content in the immersive media, wherein the providing the immersive media according to the first metaverse profile is over a network utilizing a first network slice, a first spectrum resource allocation, and a first Radio Access Technology (RAT); obtaining a second metaverse profile associated with the user, wherein the second metaverse profile includes second information associated with second user capabilities and second content presentable in the immersive media; initiating at least one of a second network slice, a second spectrum resource allocation, or a second RAT based on the second metaverse profile; detecting a triggering event associated with the immersive media, wherein the initiating is prior to the detecting of the triggering event; and continuing providing the immersive media for presentation by the end user device, wherein the continuing providing the immersive media is according to the second metaverse profile responsive to the triggering event, wherein the continuing providing the immersive media is over the network utilizing the at least one of the second network slice, the second spectrum resource allocation, or the second RAT.

One or more aspects of the subject disclosure include a method, comprising: providing, by a processing system including a processor, immersive media for presentation by an end user device of a user, wherein the providing the immersive media enables first user capabilities and first content in the immersive media, wherein the providing the immersive media is over a network utilizing a first network slice, a first spectrum resource allocation, and a first RAT; receiving, by the processing system, a request; responsive to the request, obtaining a metaverse profile associated with the user, wherein the metaverse profile includes information associated with second user capabilities and second content presentable in the immersive media; initiating at least one of a second network slice, a second spectrum resource allocation, or a second RAT based on the metaverse profile; detecting a triggering event associated with the immersive media, wherein the initiating is prior to the detecting of the triggering event; and continuing providing the immersive media for presentation by the end user device, wherein the continuing providing the immersive media is according to the metaverse profile, wherein the continuing providing the immersive media is over the network utilizing the at least one of the second network slice, the second spectrum resource allocation, or the second RAT.

One or more aspects of the subject disclosure include a non-transitory machine-readable medium, comprising executable instructions that, when executed by a processing system including a processor, facilitate performance of operations, the operations comprising: providing immersive media for presentation by an end user device of a user, wherein the providing the immersive media enables first user capabilities and first content in the immersive media, wherein the providing the immersive media is over a network utilizing a first network slice, a first spectrum resource allocation, and a first RAT; obtaining a metaverse profile associated with the user, wherein the metaverse profile includes information associated with second user capabilities and second content presentable in the immersive media; initiating at least one of a second network slice, a second spectrum resource allocation, or a second RAT based on the metaverse profile; detecting a triggering event associated with the immersive media, wherein the initiating is prior to the detecting of the triggering event; and continuing providing the immersive media for presentation by the end user device, wherein the continuing providing the immersive media is according to the metaverse profile responsive to the triggering event, wherein the continuing providing the immersive media is over the network utilizing the at least one of the second network slice, the second spectrum resource allocation, or the second RAT.

Referring now to FIG. 1, a block diagram is shown illustrating an example, non-limiting embodiment of a system 100 in accordance with various aspects described herein. In one or more embodiments, system 100 enables seamless transition between different user modes, such as from work mode to entertainment mode to online learning mode, and so on. The seamless transition(s) can be performed between and through use of multi-modal metaverse profiles without frequent swapping of gears or skip loading the metaverse applications or software.

System 100 can include a server 180 or other device or functionality (including virtual machine(s)) which can manage one or more metaverse profiles 185. The metaverse profiles 185 (only two of which are depicted) can be utilized by the server 180 or other devices (e.g., network elements, content provider equipment, customer premises equipment, end user devices, and so forth) for providing immersive media or a portion thereof (e.g., a metaverse world) to one or more users, such as via device(s) 190 (only one of which is depicted). Device 190 can be various types of devices or end user devices including a headset (e.g., AR or VR), a smartphone, a tablet, a laptop, wearable electronics, a projector, a hologram machine (e.g., 3D immersive media), or other computing device that facilitates a user(s) experiencing immersive media.

In one or more embodiments, the server 180 can execute or otherwise operate a metaverse platform for providing immersive media (or a portion thereof) to the end user device 190 which can be accessible over a communications network (e.g., network 125). In other embodiments, all or a portion of the immersive media can be provided by other device(s), including equipment of third parties that are distinct from an operator of the network 125. For example, the metaverse platform can be a centralized platform (e.g., executed by a third party server (or in the cloud), executed by a network server (or in the cloud) or executed by the end user device) or can be a distributed platform, which may use one or more devices from the network provider, third party providers, or the end user device/customer premises equipment as resources for performing functionality of the metaverse platform.

As another example, the immersive media (e.g., a metaverse world) can be a collaboration amongst different providers which can include one or more content providers 175 (which may or may not include content from the network provider). For instance, the immersive media can be provided to the end user device 190 by a network provider or another entity operating the server 180, which may or may not rely on a first metaverse profile 185A for providing or presenting the immersive media. If the first metaverse profile 185A (which can be associated with the user) is utilized, it can include various information that facilitates providing immersive media to the user, which can include information customized to particular user capabilities and/or content to be provided or otherwise allowed in the immersive media. As an example, the information of metaverse profile 185A (or other metaverse profiles described herein) can include an identification or description of user capabilities, an identification or description of content, one or more network parameters associated with presenting or enabling the user capabilities and/or the content, one or more Quality of Service (QoS) parameters or requirements (e.g., latency, throughput, and so forth) associated with presenting or enabling the user capabilities and/or the content, an identification of one or more applications for presenting or enabling the user capabilities and/or the content, or any combination thereof. In one or more embodiments, the metaverse profiles 185 can be a collection of data defining, associated with or including content and/or user capabilities, where the information can be stored together or separately for each of the profiles.

In one embodiment, the metaverse profile 185A (or other metaverse profiles described herein) can include network orchestration information, network slicing information (e.g., Single Network Slice Selection Assistance Information (S-NSSAI)), spectrum resource allocation information, frequency band(s), channels, RAT information, or other information that recommends or instructs as to how the communication session for the immersive media is to be provided or delivered to the end user device 190. In another embodiment, the metaverse profile 185A (or other metaverse profiles described herein) can include information corresponding to the user capabilities and/or content that allows the network equipment (e.g., server 180) to derive or otherwise determine network orchestration information, network slicing information (e.g., S-NSSAI), spectrum resource allocation information, frequency band(s), channels, RAT information, or other information that is to be used in establishing or facilitating the communication session for the immersive media to be provided or delivered to the end user device 190.

In one embodiment, the metaverse profile 185A (or other metaverse profiles described herein) can include information that is selected or determined based on providing a particular user mode when the end user device 190 is engaged in the immersive experience, such as a work mode, an entertainment mode, a learning mode, and so forth. These different modes can correspond to different user capabilities and/or content, such as providing a secure RAT with encryption and low-key content (e.g., soft background music) for a metaverse profile corresponding to a work mode where a user enters a metaverse world to speak with a supervisor regarding an employment matter, but providing a RAT without encryption and up-beat content (e.g., louder background music and avatars dancing for a metaverse profile corresponding to an entertainment mode where a user enters a metaverse world for an online happy-hour).

In one embodiment, the server 180 can obtain a second metaverse profile 185B (e.g., associated with the user), which can include information associated with other user capabilities and/or other content presentable in the immersive media, which may or may not be some of the user capabilities and/or content of the first metaverse profile 185A. In one embodiment, at least one of a different network slice(s), different spectrum resource allocation(s), or different RAT(s) can be selected and initiated, such as by the server 180, based on the second metaverse profile. In one embodiment, events in or associated with the immersive media, such as user actions and/or user interactions, can be monitored (e.g., by the server 180) to detect a transition event, and the obtaining of the second metaverse profile can be responsive to detecting the transition event. In one embodiment, the transition event can be used as a trigger for the selection and initiation of the at least one of the different network slice(s), different spectrum resource allocation(s), or different RAT(s). In one embodiment, events in or associated with the immersive media, such as user actions and/or user interactions, can be monitored (e.g., by the server 180) to detect a triggering event, and the selection and initiation of the at least one of the different network slice(s), different spectrum resource allocation(s), or different RAT(s) can be prior to the detecting of the triggering event. In this example, the immersive media can continue to be provided for presentation by the end user device 190 according to the second metaverse profile 185B utilizing the at least one of the different network slice(s), different spectrum resource allocation(s), or different RAT(s).

In one embodiment, a machine learning model can be applied (e.g., by the server 180) to user actions and user interactions of the user with the immersive media (or other information associated with providing the immersive media including network conditions, time of day, number of users, activities of other users, and so forth) to detect the transition event and/or the triggering event. The machine learning model can be various types including supervised, unsupervised, federated, and so forth. The machine learning model can be trained on various data, including historical user actions and user interactions of the particular user with the immersive media or with other immersive media types, historical user actions and user interactions of other users (e.g., determined to have similar characteristics, habits or traits as the user) with the immersive media or with other immersive media types.

In one embodiment, the server 180 can obtain the second (or subsequent) metaverse profile(s) as a selection and aggregation (in whole or in part) from a group of metaverse profiles 185 of the user or of other users (e.g., having similar traits as the user). As an example, the user can have several business-related profiles that define particular circumstances such as a conference call profile, a training profile, and a human resources profile. In this example, the conference call profile and the human resources profile can be merged or aggregated (in whole or in part), such as by the server 180, when a user is entering a metaverse world to discuss personal health benefits with the HR department. Other types of metaverse profiles can be merged or aggregated (in whole or in part) (e.g., by the server 180), such as social-related profiles, educational profiles, and so forth. In one or more embodiments, one, some, or all of these groups of metaverse profiles can be generated or created prior to the providing of the immersive media, such as a user having pre-configured metaverse profiles stored in a database.

In one or more embodiments, a machine learning model can be applied (e.g., by the server 180) to user actions and user interactions of the user with the immersive media (or other information associated with providing the immersive media including network conditions, time of day, number of users, activities of other users, and so forth) to determine profile adjustments, and an adjusted metaverse profile can be created or generated from selected metaverse profiles according to the profile adjustments. The machine learning model can be various types including supervised, unsupervised, federated, and so forth. The machine learning model can be trained on various data, including historical user actions and user interactions of the particular user with the immersive media or with other immersive media types, historical user actions and user interactions of other users (e.g., determined to have similar characteristics, habits or traits as the user) with the immersive media or with other immersive media types.

In one or more embodiments, the server 180 or other device can select a plurality of metaverse profiles from a group of metaverse profiles of the user, where one, some or all of the group of metaverse profiles is generated prior to the providing of the immersive media; and the server 180 can generate the second (or subsequent) metaverse profile(s) based on a portion of user capabilities and a portion of content associated with the plurality of metaverse profiles.

In one or more embodiments, one or more portions (e.g., over different intervals or time periods of the service) of the immersive media is provided for presentation by the end user device without relying upon or utilizing a metaverse profile, such as initiating the immersive media session for the end user device 190 utilizing a first metaverse profile 185A and then terminating the first metaverse profile while continuing with the communication session, such as providing user capabilities and/or content that is not defined or associated with any metaverse profiles or performing a selection and initiation of at least one of a different network slice(s), different spectrum resource allocation(s), or different RAT(s) that is not defined or associated with any metaverse profiles. In one or more embodiments, a termination request can be received from the end user device, where subsequently continuing providing the immersive media without utilizing the second metaverse profile is in response to the termination request.

In one or more embodiments, the continuing providing the immersive media according to the second (or subsequent) metaverse profile(s) includes providing in the immersive media at least a portion of user capabilities and/or content from an earlier or terminated metaverse profile, which may have been terminated by user request or naturally.

In one or more embodiments, the timing of the transitioning (e.g., selection and/or initiation of at least one of a different network slice(s), different spectrum resource allocation(s), or different RAT(s)) can be selected so as to allow for seamless transition to a subsequent metaverse profile. As an example, the server 180 can utilize or enforce a minimum threshold time period between a selected transition event and a selected triggering event, such as detecting that a user appears tired during a card game being played in the metaverse world (e.g., identifying yawning by the user, determining that the user is speaking less than normal, determining that the user has been playing for a particular time period, determining that the user has made more errors than normal, and so forth); then selecting and initiating a different network slice(s), different spectrum resource allocation(s), and/or different RAT(s) for transition to a subsequent metaverse profile to allow the user to listen to music in a peaceful area of the metaverse world; then waiting the threshold time period; then detecting a triggering event thereafter such as the end of a particular round or hand of the card game; and then switching to the subsequent metaverse profile that enables the music listening activity for the user via a seamless switch of the immersive experience.

In one or more embodiments, the threshold time periods can vary and/or can be dynamic based on various factors, such as network conditions, available resources, complexity of the selected metaverse profile, amount of time predicted for spinning up a particular network slice for the selected network profile, and so forth. In one embodiment, a machine learning model can facilitate determining the threshold time periods. In one or more embodiments, the selected network slice(s) can be dedicated to providing the immersive media or providing the service to the particular end user device. In one or more embodiments, the metaverse profiles can be associated with a user, a group of users (e.g., family, friends, co-workers), end user devices, e-commerce vendors, and/or content providers.

As an example, system 100 can facilitate in whole or in part providing immersive media to a computing device (e.g., according to a first metaverse profile that includes first information defining or associated with first user capabilities and first content in the immersive media) over a network utilizing a first network slice, a first spectrum resource allocation, and/or a first RAT; obtaining a second metaverse profile associated with the user, which includes second information defining or associated with second user capabilities and second content presentable in the immersive media; processing or initiating a second network slice, a second spectrum resource allocation, and/or a second RAT based on the second metaverse profile; continuing providing the immersive media to the computing device (e.g., according to the second metaverse profile) over the network utilizing the second network slice, the second spectrum resource allocation, and/or the second RAT where the processing or initiating can be prior to the detecting of the triggering event, and where the continuing providing the immersive media is responsive to the triggering event.

In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
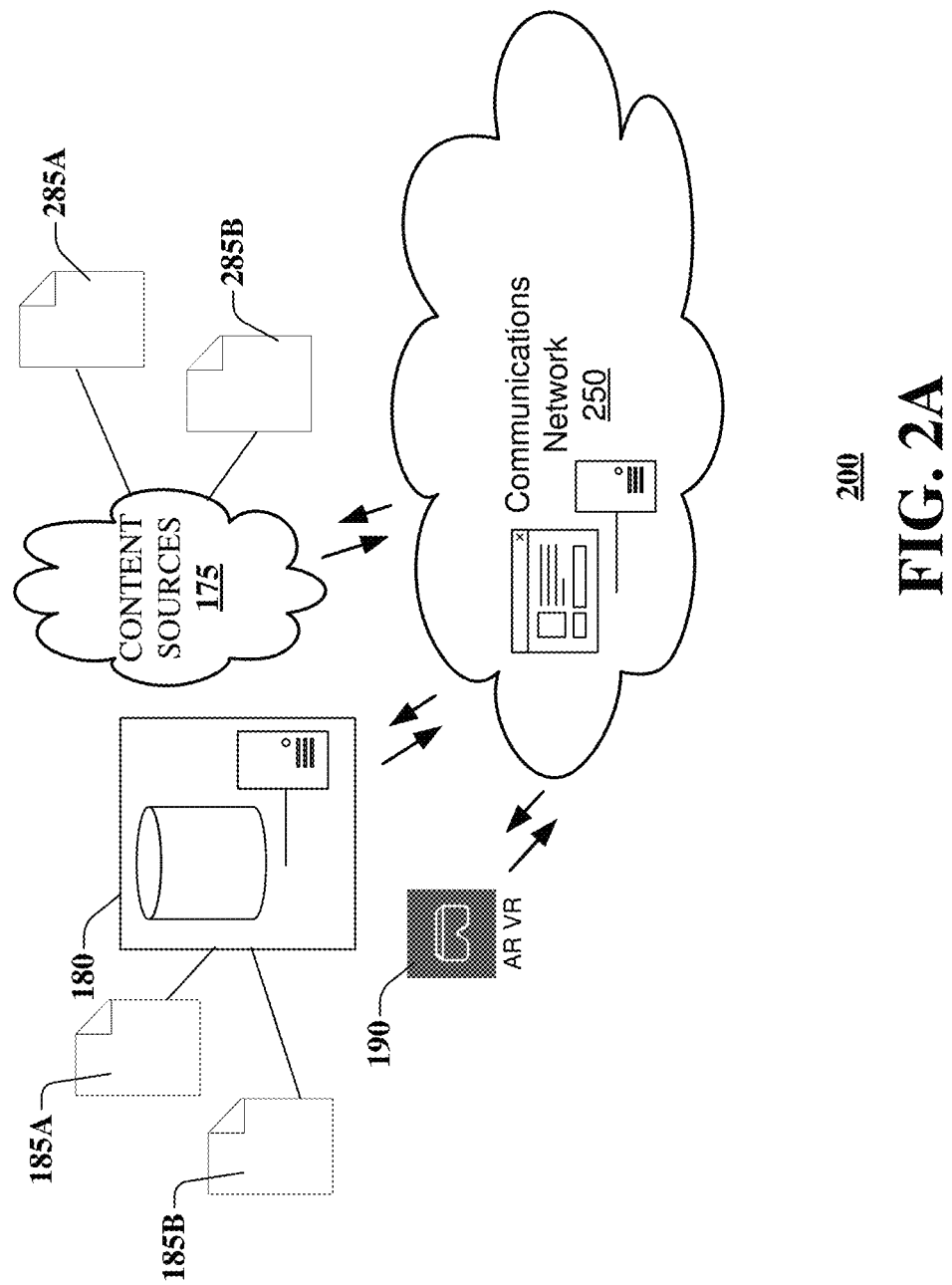
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200 functioning within the communication network of FIG. 1 in accordance with various aspects described herein. In one or more embodiments, system 200 provides a needs-aware connection between a user and metaverse profiles, which can enable dynamic adjusting of the metaverse experience in an automated technique. In one or more embodiments, system 200 provides metaverse profile creation via leveraging network slicing technology, spectrum allocation, and/or radio technologies.

As an example, a user can be using AR glasses 190 for remote learning via a WiFi connection, but desires to switch to cloud gaming. In this example, the AR glasses 190 could utilize a direct cellular connection to prepare a gaming metaverse profile (e.g., associated with the user or a default gaming profile) without impacting the remote learning. In another example, the gaming metaverse profile can be loaded via a different WiFi channel (e.g., remote learning on 5 GHz channel while preparing gaming on 6 GHz channel). In another example, a different network slice can be employed for the transition, such as remote learning on slice A while preparing gaming on slice B.

In one or more embodiments, system 200 enables dynamically switching metaverse profiles based on various triggering events, such as a user's instruction (e.g., voice, eyeball movement, facial cue, gesture, etc.). In this example, the metaverse profile can be automatically switched, whereby system 200 is preparing the target metaverse profile ahead of time to reduce any transition delay. In one or more embodiments, system 200 can apply machine learning to train an AI agent to facilitate or assist the automated transition. In one or more embodiments, system 200 can release the metaverse profile naturally. For example, the system 200 can automatically terminate the complete metaverse profile, release the network slice, unused RAT and/or network spectrum resource used by a previous metaverse profile (e.g., when the system determines a particular task is complete). In one or more embodiments, system 200 releases the metaverse profile naturally without interference to the physical world. In one or more embodiments, system 200 enables the user to retain control (e.g., with assistance from the system as needed) to terminate any profile that they do not desire or may not be comfortable with.

In one or more embodiments, system 200 allows grouping of the metaverse profiles to create a metaverse social personality as a service. For example, the system can create a group of metaverse profiles as a service for social purposes. In one embodiment, the group size can be adjustable so as to cater to the need of the virtual social activities.

In one or more embodiments, system 200 provides a software defined metaverse personality for a user(s) which can be a mix of virtual world and physical world characteristics, capabilities and content, and a mixture of work life and personal life. In one or more embodiments, system 200 enables converting a root ID device to a different profile in different metaverse profiles. As an example, a unique ID can correspond to a metaverse characteristic such as work in order to meet people virtually, which can enable a smooth and real time transition. In one or more embodiments, system 200 enables attaching to different metaverse profiles via different interfaces.

In one or more embodiments, system 200 enables metaverse personalities which can define policies to become active and inactive. In one or more embodiments, system 200 enables monitoring and making decisions based on physical locations, such as adapting a virtual experience based on determining a strong or poor wireless connection in the physical world. In one or more embodiments, system 200 enables autonomic principles for system management and orchestration in a metaverse world. In one or more embodiments, system 200 enables physical world root IDs controlling the selection(s) of virtual world profiles. In one or more embodiments, system 200 enables different network slices and/or physical spectrum segmentation to be utilized for different metaverse profiles, which can be pre-arranged prior to transitioning between profiles.

System 200 can include the server 180 or other device or functionality (including virtual machine(s)) which can manage the one or more metaverse profiles 185 as described with respect to system 100. In this example, one or more content providers 175 can have metaverse profiles 285 (only two of which are depicted) which can be utilized by the server 180 or other devices (e.g., network elements, content provider equipment, customer premises equipment, end user devices, and so forth) for providing immersive media or a portion thereof (e.g., a metaverse world) to one or more users, such as via the device(s) 190.

The profiles 185, 285 can be stored at various locations and combinations of locations (e.g., centralized storage and/or distributed storage for each profile) including in the network, at server 180, at end user devices 190, and/or in content provider storage (not shown). As described herein, the profiles 285 can be generated or created in a number of different ways by various devices, and can include various information that facilitates the content provider presenting content and/or user interactions with the content such as network orchestration information, network slicing information (e.g., S-NSSAI), spectrum resource allocation information, frequency band(s), channels, RAT information, or other information that recommends or instructs as to how the content provider can contribute to or otherwise provide content for the immersive media that is to be provided or delivered to the end user device 190. In another embodiment, the metaverse profile 185A (or other metaverse profiles described herein) can include information corresponding to the user capabilities and/or content that allows the network equipment (e.g., server 180) to derive, calculate, select, or otherwise determine network orchestration information, network slicing information (e.g., S-NSSAI), spectrum resource allocation information, frequency band(s), channels, RAT information, or other information that is to be used in providing content for the immersive media.

For example, a first profile 285A can facilitate a content provider presenting content and/or user interactions with the content for a first user mode such as where the user is doing e-commerce on behalf of a business (e.g., purchasing equipment, materials, office supplies, etc.). In this example, the user can be transitioned to a second user mode via a second profile 285B such as where the user is doing e-commerce for personal items (e.g., home supplies, groceries, etc.). The first and second profiles 285A, B can include different storefronts (operated or associated with a same or different entities), different items, different backgrounds, different purchasing tools/IDs/accounts, and so forth. For instance, the user can be purchasing office supplies for a business and then the system can detect that the user is viewing/searching sports clothing. This can trigger preparing or otherwise initiating the second profile 285B (which can include spinning up or facilitating use of a different network slice, a different spectrum resource allocation, and/or a different RAT based on the profile 285B) for presenting a new/adjusted storefront (which can include hinting or directing the user to move to the new storefront in a metaverse world) and thereafter presenting the new/adjusted storefront.

The metaverse platform can be a centralized platform (e.g., executed by a third party server (or in the cloud), executed by a network server (or in the cloud), executed by server 180, or executed by the end user device) or can be a distributed platform, which may use one or more devices from the network provider, third party providers, or the end user device/customer premises equipment as resources for performing functionality of the metaverse platform.

In one or more embodiments, users can have different modes with which to operate in the metaverse such as entertainment mode, family mode, friends mode, work mode, learning mode, relaxing mode, and so forth, which can be based on a user behaving differently when interacting in that mode with other users (such as family or friends). In one or more embodiments, users can see different environments from different metaverse profiles in a digital world and a virtual world. In one or more embodiments, users can switch or be switched between multi-mode metaverse profiles based on needs or desires, such as quickly transitioning from an online training mode to an entertainment mode or family-care mode.

In one or more embodiments, generating background (e.g., content shown in a virtual world) for profiles requires rendering a large amount of content, which can be performed (in whole or in part) ahead of time via processing of a network configuration and/or processing on a device-side, end to end. In one or more embodiments, a different mode provided through use of a different metaverse profile can be implemented without significant delay or any user experience interruption.

In one or more embodiments, the system can monitor and predict digital activity as to what the user will desire to do next, such as based on user commands, user behaviors in the metaverse, user behaviors in the real world, historical information regarding these user behaviors (e.g., monitoring that the user commutes from 6 PM to 7 PM on a train with typically a weaker connection and often listens to music while sleeping), and so forth.

In one or more embodiments, content for the selected profile being delivered to the user can be provided in whole or in part by a third party, such as a content provider including content stored on their server and/or in the cloud. Continuing with this example, the telecommunication network service provider can provide an end-to-end network platform in order to meet requirements (e.g., latency threshold, throughput threshold, level of security/encryption, etc.) of different applications (e.g., associated with different user profiles). This network provider can provide orchestration and platform guidance on steering content, such as from particular server locations (e.g., selection of a particular content provider server that is co-located with the network equipment). In one or more embodiments, mobile edge computing can be implemented to facilitate content delivery for the metaverse profiles including selecting content provider servers that are within a proximity to an edge server.

In one or more embodiments, user habits and user behaviors can be utilized to predicted via machine learning what time to intervene in user activity to do a smooth transition instead of a hard code transition. In one or more embodiments, a network service provider can coordinate with content provider(s) as to a next profile to load for a user such as determining from information provided by the user and/or a content provider that a work profile should be loaded next and will need particular network slicing, latency requirements, and so forth.

For example, an indication/request could be determined or received that a user will be loading a particular application(s) of a content provider(s) and the network provider can determine the appropriate metaverse profile(s) to be loaded. In one or more embodiments, a network slice can carry a basic metaverse profile on a network server or the cloud as a basic background and then the network provider can locate the server closer to users, such as a gaming event in a stadium. A content provider could further provide services (e.g., content and/or user capabilities) on top of the basic profile. In one or more embodiments, different network slicing can be utilized for different profiles which can be more efficient and faster in delivering services and affecting a transition.

In one or more embodiments, the metaverse profile associated with a content provider (e.g., a furniture store) can be used in conjunction with information from another source (e.g., building plans department for the user's home) for building aggregated content, such as a remodeling view of the user's home utilizing the furniture stores items.

In one or more embodiments, the metaverse profiles can be aggregated to provide any level of granularity selected by the user or determined to be desired by the user, such as for a first user utilizing just a basic metaverse profile of home décor, but for a second user utilizing aggregated metaverse profiles that are combined to layout home décor in a simulation of a floor plan for the user's home.

In one or more embodiments, different profiles associated with different content providers can be aggregated such as a furniture store and a carpet store, where the system determines compatibility.

In one or more embodiments, a first metaverse profile can be created by a network provider and a second profile can be created by a content provider. In this example, the first profile may be one that is a common profile provided by the network provider to multiple subscribers and the second profile can be additional services provided by the content provider that are compatible with the services of the first profile, such as the first profile being a work profile that facilitates video conference calls and the second profile being a digital whiteboard that can be utilized within a video conference and can be written on by multiple users. In this example, the second profile may require different network slicing, different resource allocation and/or a different RAT to deliver QoS requirements for the digital whiteboard. In one embodiment, the system can determine (or receive a request) that a digital whiteboard would be useful and (without interrupting the video conference) can begin preparing the second profile and then deliver the digital whiteboard into the video conference utilizing the second profile.

In one or more embodiments, a network provider can allow users to utilize a common profile (e.g., without any additional cost) and also can provide a customized profile (e.g., with an additional cost) when a user is seeking a particular service, such as online gaming, video conferencing, and so forth. In one or more embodiments, the generation of the vendor-based profiles can be done via coordination between the network provider and the content providers to facilitate compatibility. In one or more embodiments, machine learning can be applied to adjust metaverse profiles, including user profiles or vender-based profiles, where the machine learning can customize the profiles to a particular user or group of users (e.g., having similar characteristics).

In one or more embodiments, the transitioning to a new profile can be determined by the content provider and preparation of the new profile can be requested by the content provider so that the network provider can initiate aspects of the profile, such as through network slicing, spectrum resource allocation, and/or RAT selection. In this example, the content provider can determine the transitioning through the various techniques described herein, including applying a machine learning model. In other embodiments, the transitioning determination can be done by the network provider or can be a coordination between providers such as both providers needing to detect a transition requirement before it is implemented.

In one or more embodiments, an upgrade or change request (that will be implemented via a transition to or addition of another profile) can be from the UE, other UEs in the immersive environment, or other devices, including network devices. In one or more embodiments, multiple content providers can enable VR/AR environments on top of each other (and/or on top of the network provider background content) such as a furniture store and a supermarket in a same shopping mall virtual world or a restaurant inside of a furniture store in a virtual world, where the virtual activities can result in real world activities such as delivery of take-out food to your home that is purchased in the virtual world.

In one or more embodiments, each of the metaverse profiles of the user can include information associated with and/or defining user capabilities and content in the immersive media.

Figure 2B:
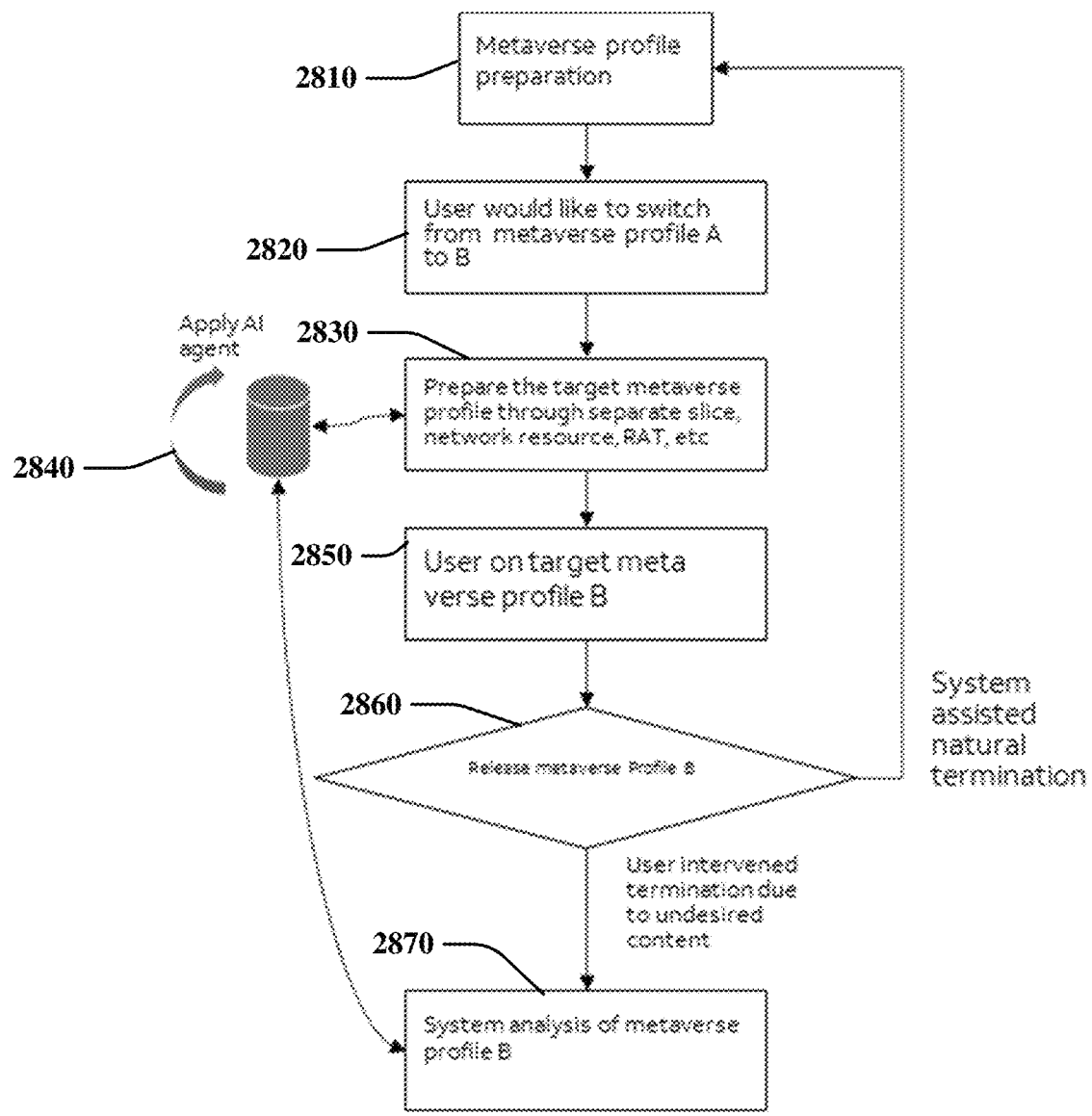
FIG. 2B depicts an illustrative embodiment of a method in accordance with various aspects described herein.

FIG. 2B depicts an illustrative embodiment of a method 280 in accordance with various aspects described herein. At 2810, a metaverse profile can be prepared. This can be done based on various information (including user characteristics, historical behavior, user requests, user location in a metaverse world and so forth), and various techniques (including machine learning). The preparation can include selection and initiation of network slicing, spectrum resource allocation, and/or RAT. At 2820, it can be determined that a switch between profiles is appropriate, which can be determined based on a request, an analysis, or some other trigger.

At 2830, the target profile can be prepared while the user continues the immersive experience utilizing the original profile. This can include selecting and initiating network slicing, spectrum resource allocation, and/or RAT for the target profile. In one embodiment, machine learning can be applied to facilitate the switching of the profile, including selecting among network slicing, spectrum resource allocation, and/or RAT to provide the target profile. At 2850, the immersive experience can continue to be provided to the user via the target profile. At 2860, a termination of the target profile can occur, such as a system assisted natural termination or a user-intervention termination (e.g., undesired content being provided via the target profile). At 2870, the target profile can be analyzed, such as by the machine learning of 2835, based on circumstances surrounding the user-based termination of the target profile.

Figure 2C:
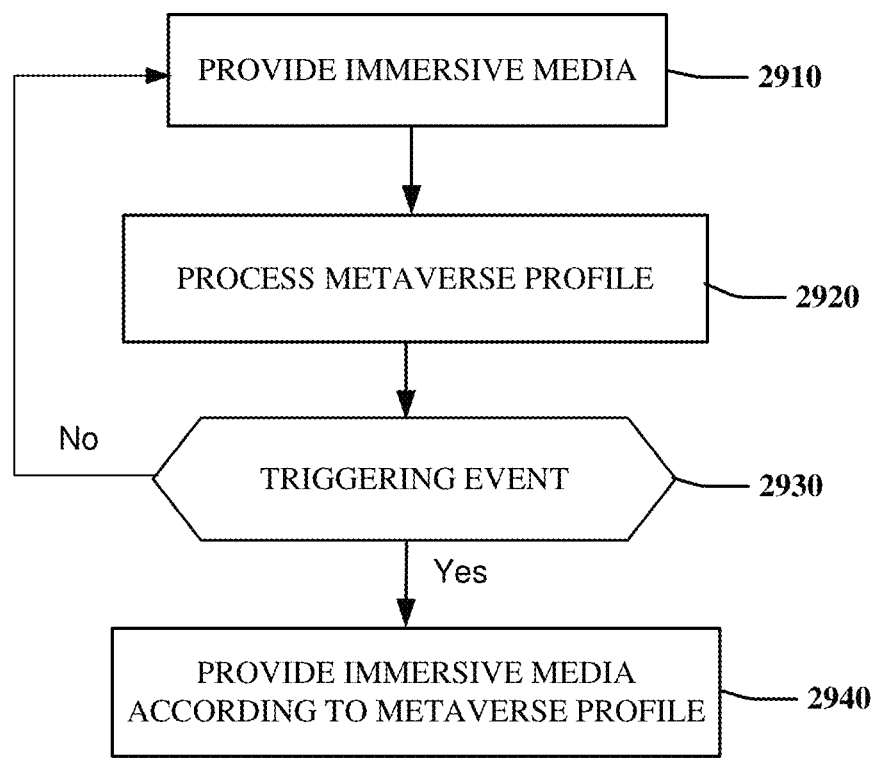
FIG. 2C depicts an illustrative embodiment of a method in accordance with various aspects described herein.

FIG. 2C depicts an illustrative embodiment of a method 290 in accordance with various aspects described herein. At 2910, immersive media can be provided for presentation by an end user device of a user, where the providing the immersive media enables first user capabilities and first content in the immersive media, and where the providing the immersive media is over a network utilizing a first network slice, a first spectrum resource allocation, and a first RAT. At 2920, a metaverse profile (e.g., one or more of: associated with the user, associated with a content provider, a default profile associated with the intended user activity, and so forth) can be obtained and processed or otherwise prepared. The metaverse profile can include information associated with second user capabilities and second content presentable in the immersive media, such as where a user who has been in a metaverse conference call with co-workers desires to play video gaming. As an example, the processing can include initiating at least one of a second network slice, a second spectrum resource allocation, or a second RAT based on the metaverse profile. This preparation can be performed while the user continues the metaverse experience via the first network slice, the first spectrum resource allocation, and the first RAT. At 2930, a triggering event can be detected or determined, such as an event occurring in the immersive media, or a request from a user. The triggering event can cause at 2940 the immersive media to be provided for presentation by the end user device according to the metaverse profile.

In one embodiment, the obtaining of the metaverse profile comprises: selecting a plurality of metaverse profiles from a group of metaverse profiles of the user, where the group of metaverse profiles is generated prior to the providing of the immersive media; and generating the metaverse profile based on a portion of user capabilities and a portion of content defined in the plurality of metaverse profiles. In one embodiment, the immersive media is one of virtual reality or augmented reality, and the method includes monitoring user actions and user interactions of the user with the immersive media and applying a machine learning model to detect a transition event and to detect the triggering event, where the obtaining the metaverse profile is in response to the transition event, and where a selection of the portion of the user capabilities and the portion of the content of the plurality of metaverse profiles is based on the monitoring of the user actions and the user interactions.

While for purposes of simplicity of explanation, the respective processes are shown and described as a series of blocks in FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200, and methods 280, 290 presented in FIGS. 1, 2A, 2B, 2C, and 3. For example, virtualized communication network 300 can facilitate in whole or in part providing immersive media to a computing device (e.g., according to a first metaverse profile that includes first information defining or associated with first user capabilities and first content in the immersive media) over a network utilizing a first network slice, a first spectrum resource allocation, and/or a first RAT; obtaining a second metaverse profile associated with the user, which includes second information defining or associated with second user capabilities and second content presentable in the immersive media; processing or initiating a second network slice, a second spectrum resource allocation, and/or a second RAT based on the second metaverse profile; continuing providing the immersive media to the computing device (e.g., according to the second metaverse profile) over the network utilizing the second network slice, the second spectrum resource allocation, and or the second RAT where the processing or initiating can be prior to the detecting of the triggering event, and where the continuing providing the immersive media is responsive to the triggering event.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
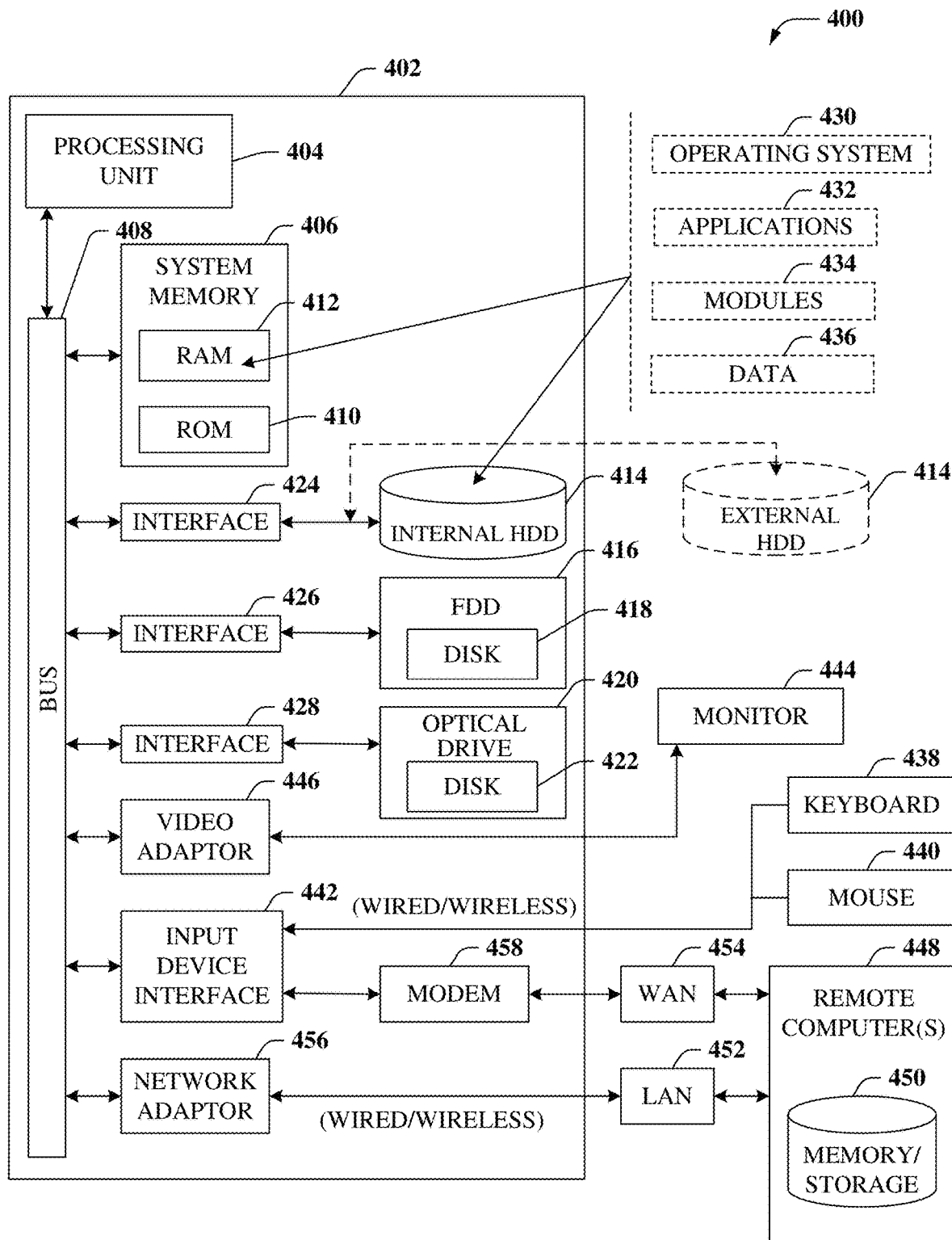
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part providing immersive media to a computing device (e.g., according to a first metaverse profile that includes first information defining or associated with first user capabilities and first content in the immersive media) over a network utilizing a first network slice, a first spectrum resource allocation, and/or a first RAT; obtaining a second metaverse profile associated with the user, which includes second information defining or associated with second user capabilities and second content presentable in the immersive media; processing or initiating a second network slice, a second spectrum resource allocation, and/or a second RAT based on the second metaverse profile; continuing providing the immersive media to the computing device (e.g., according to the second metaverse profile) over the network utilizing the second network slice, the second spectrum resource allocation, and or the second RAT where the processing or initiating can be prior to the detecting of the triggering event, and where the continuing providing the immersive media is responsive to the triggering event.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
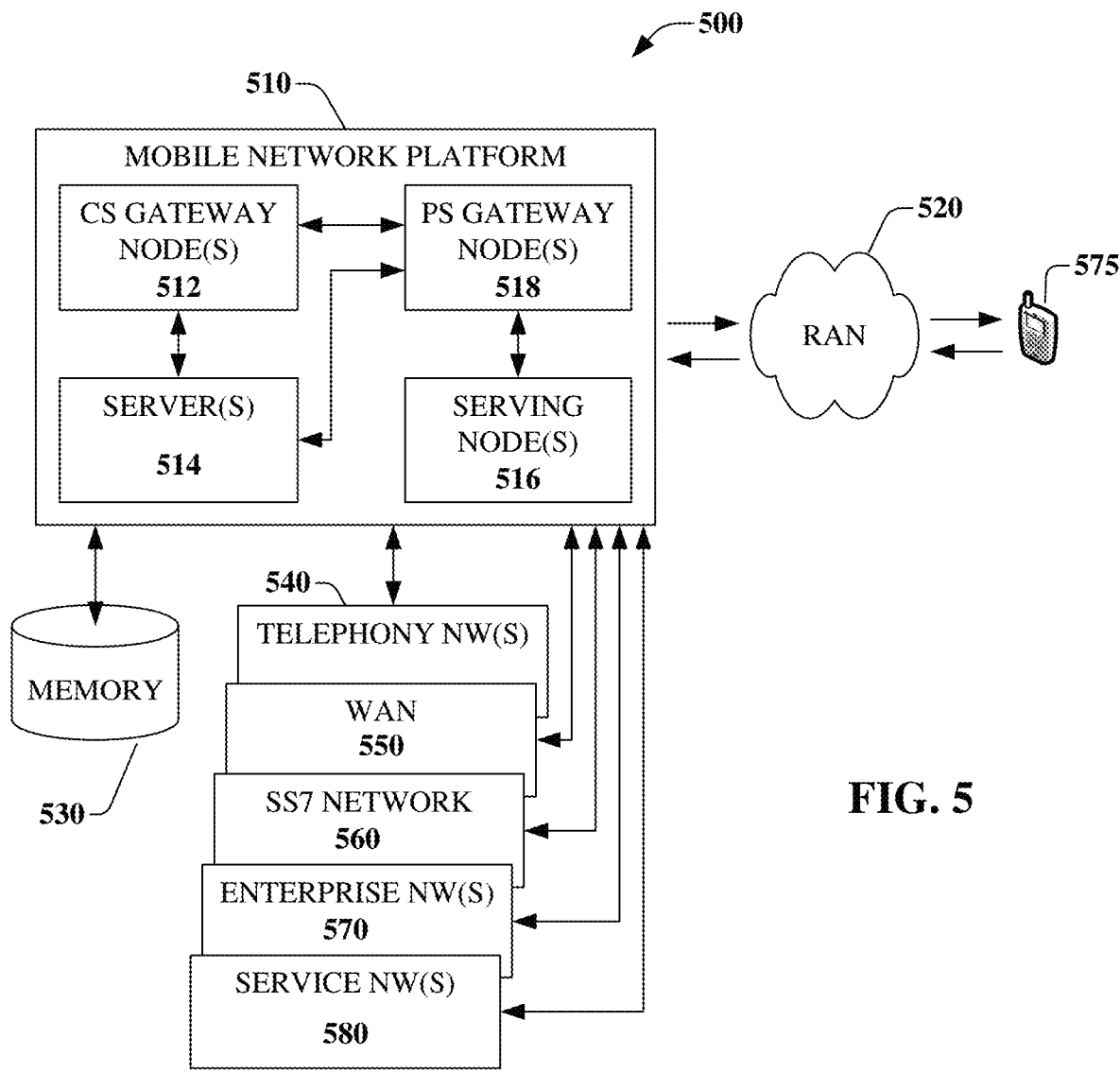
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part providing immersive media to a computing device (e.g., according to a first metaverse profile that includes first information defining or associated with first user capabilities and first content in the immersive media) over a network utilizing a first network slice, a first spectrum resource allocation, and/or a first RAT; obtaining a second metaverse profile associated with the user, which includes second information defining or associated with second user capabilities and second content presentable in the immersive media; processing or initiating a second network slice, a second spectrum resource allocation, and/or a second RAT based on the second metaverse profile; continuing providing the immersive media to the computing device (e.g., according to the second metaverse profile) over the network utilizing the second network slice, the second spectrum resource allocation, and or the second RAT where the processing or initiating can be prior to the detecting of the triggering event, and where the continuing providing the immersive media is responsive to the triggering event.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
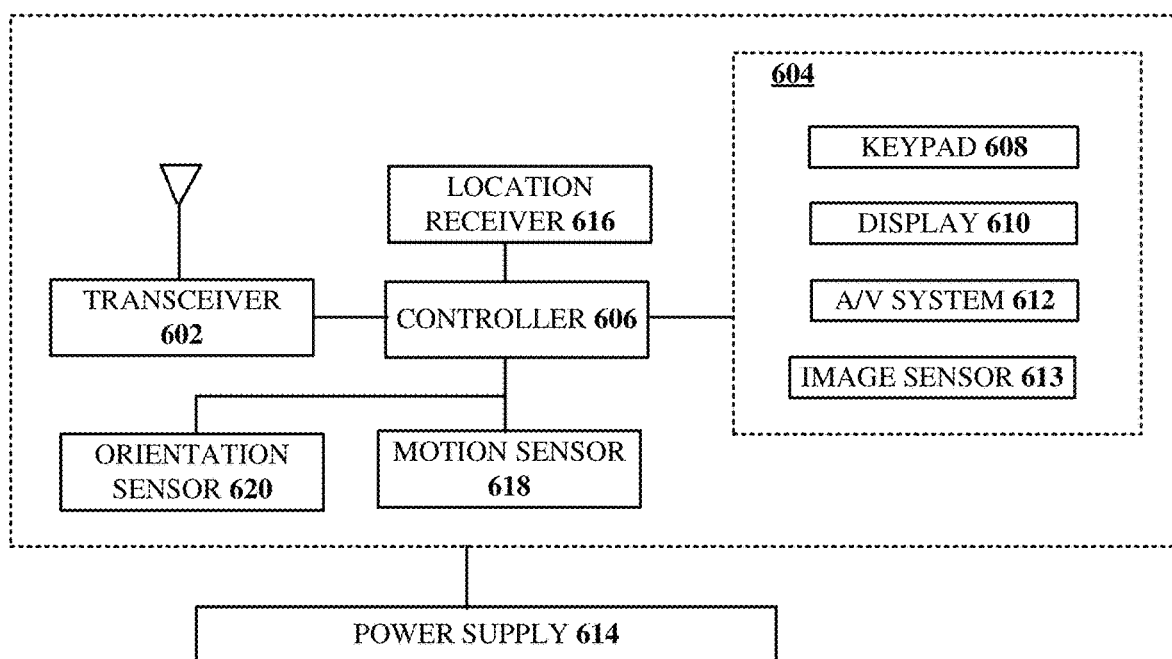
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part providing immersive media to a computing device (e.g., according to a first metaverse profile that includes first information defining or associated with first user capabilities and first content in the immersive media) over a network utilizing a first network slice, a first spectrum resource allocation, and/or a first RAT; obtaining a second metaverse profile associated with the user, which includes second information defining or associated with second user capabilities and second content presentable in the immersive media; processing or initiating a second network slice, a second spectrum resource allocation, and/or a second RAT based on the second metaverse profile; continuing providing the immersive media to the computing device (e.g., according to the second metaverse profile) over the network utilizing the second network slice, the second spectrum resource allocation, and or the second RAT where the processing or initiating can be prior to the detecting of the triggering event, and where the continuing providing the immersive media is responsive to the triggering event.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method, comprising:
providing, by a processing system including a processor, immersive media for presentation by an end user device of a user, wherein the providing the immersive media enables first user capabilities and first content in the immersive media, wherein the providing the immersive media is over a network utilizing a first network slice, a first spectrum resource allocation, and a first Radio Access Technology (RAT);
receiving, by the processing system, a request;
responsive to the request, obtaining, by the processing system, a metaverse profile associated with the user, wherein the metaverse profile includes information associated with second user capabilities and second content presentable in the immersive media;
initiating, by the processing system, at least one of a second network slice, a second spectrum resource allocation, or a second RAT based on the metaverse profile;
detecting, by the processing system, a triggering event associated with the immersive media, wherein the initiating is prior to the detecting of the triggering event;
continuing providing, by the processing system, the immersive media for presentation by the end user device, wherein the continuing providing the immersive media is according to the metaverse profile, wherein the continuing providing the immersive media is over the network utilizing the at least one of the second network slice, the second spectrum resource allocation, or the second RAT;
monitoring, by the processing system, one of user actions, user interactions, or both user actions and interactions of the user with the immersive media to obtain monitored activity; and
applying, by the processing system, a machine learning model to the monitored activity to the detecting the triggering event and to detect a transition event in the immersive media, wherein the immersive media is one of virtual reality or augmented reality, and wherein the obtaining the metaverse profile is in response to the transition event.

2. The method of claim 1, wherein the receiving the request is from the end user device, wherein the information comprises an identification of the second user capabilities, an identification of the second content, one or more network parameters associated with at least one of the second user capabilities or the second content, one or more QoS parameters associated with at least one of the second user capabilities or the second content, an identification of one or more applications for presenting at least one of the second user capabilities or the second content, or any combination thereof.

3. The method of claim 1, wherein the providing the immersive media enabling the first user capabilities and the first content in the immersive media is according to a default metaverse profile that is generated by equipment of a first entity that operates the network, wherein the default metaverse profile includes default information associated with the first user capabilities and the first content, and wherein the second user capabilities and the second content in the immersive media of the metaverse profile is provided by equipment of a second entity operating as a content provider that is distinct from the first entity.

4. The method of claim 1, wherein the continuing providing the immersive media according to the metaverse profile includes providing in the immersive media at least a portion of: the first user capabilities, the first content, or a combination thereof.

5. The method of claim 1, wherein a first entity operates the network, wherein the providing the immersive media enabling the first user capabilities and the first content in the immersive media is according to another metaverse profile that includes first information associated with the first user capabilities and the first content, wherein the first user capabilities and the first content in the immersive media of the other metaverse profile is provided by equipment of a second entity operating as a content provider that is distinct from the first entity, and wherein the second user capabilities and the second content in the immersive media of the metaverse profile is provided by equipment of a third entity operating as another content provider that is distinct from the first and second entities.

6. The method of claim 5, wherein the continuing providing the immersive media according to the metaverse profile includes providing in the immersive media at least a portion of: the first user capabilities, the first content, or a combination thereof.

7. The method of claim 1, wherein the obtaining of the metaverse profile comprises:
selecting, by the processing system, a plurality of metaverse profiles from a group of metaverse profiles of the user, wherein the group of metaverse profiles is generated prior to the providing of the immersive media; and
generating, by the processing system, the metaverse profile based on a portion of user capabilities and a portion of content defined in the plurality of metaverse profiles.

8. A device, comprising:
a processing system including a processor; and
a memory that stores executable instructions that, when executed by the processing system, facilitate performance of operations, the operations comprising:
providing immersive media for presentation by an end user device of a user, wherein the providing the immersive media is according to a first metaverse profile of the user that includes first information associated with first user capabilities and first content in the immersive media, wherein the providing the immersive media according to the first metaverse profile is over a network utilizing a first network slice, a first spectrum resource allocation, and a first Radio Access Technology (RAT);
obtaining a second metaverse profile associated with the user, wherein the second metaverse profile includes second information associated with second user capabilities and second content presentable in the immersive media;
initiating at least one of a second network slice, a second spectrum resource allocation, or a second RAT based on the second metaverse profile;
detecting a triggering event associated with the immersive media, wherein the initiating is prior to the detecting of the triggering event;
continuing providing the immersive media for presentation by the end user device, wherein the continuing providing the immersive media is according to the second metaverse profile responsive to the triggering event, wherein the continuing providing the immersive media is over the network utilizing the at least one of the second network slice, the second spectrum resource allocation, or the second RAT;
monitoring one of user actions, user interactions, or both user actions and interactions of the user with the immersive media to obtain monitored activity; and
applying a machine learning model to the monitored activity to detect the triggering event and to detect a transition event in the immersive media, wherein the immersive media is one of virtual reality or augmented reality, and wherein the obtaining the second metaverse profile is in response to the transition event.

9. The device of claim 8, wherein the second information comprises an identification of the second user capabilities, an identification of the second content, one or more network parameters associated with at least one of the second user capabilities or the second content, one or more QoS parameters associated with at least one of the second user capabilities or the second content, an identification of one or more applications for presenting at least one of the second user capabilities or the second content, or any combination thereof.

10. The device of claim 8, wherein the immersive media is one of virtual reality or augmented reality, and wherein the operations further comprise:
applying a machine learning model to one of user actions, user interactions of the user, or both within the immersive media to detect a transition event, wherein the obtaining the second metaverse profile is in response to the transition event.

11. The device of claim 8, wherein the obtaining of the second metaverse profile is a selection from a group of metaverse profiles of the user including a business-related profile and a social-related profile, and wherein the group of metaverse profiles is generated prior to the providing of the immersive media.

12. The device of claim 8, wherein the operations further comprise:
applying a machine learning model to user actions and user interactions of the user with the immersive media to determine profile adjustments; and
adjusting at least one of the first or second metaverse profiles according to the profile adjustments.

13. The device of claim 8, wherein the obtaining of the second metaverse profile comprises:
selecting a plurality of metaverse profiles from a group of metaverse profiles of the user, wherein the group of metaverse profiles is generated prior to the providing of the immersive media; and
generating the second metaverse profile based on a portion of user capabilities and a portion of content associated with the plurality of metaverse profiles.

14. The device of claim 13, wherein the immersive media is one of virtual reality or augmented reality, and wherein the operations further comprise:
monitoring user actions and user interactions of the user with the immersive media to detect a transition event and to detect the triggering event, wherein the obtaining the second metaverse profile is in response to the transition event, and wherein a selection of the portion of the user capabilities and the portion of the content defined in the plurality of metaverse profiles is based on the monitoring of the user actions and the user interactions.

15. The device of claim 8, wherein the operations further comprise:

subsequently continuing providing the immersive media for presentation by the end user device, wherein the subsequently continuing providing the immersive media is performed without utilizing the second metaverse profile.

16. The device of claim 15, wherein the operations further comprise:
receiving a termination request from the end user device, wherein the subsequently continuing providing the immersive media without utilizing the second metaverse profile is in response to the termination request.

17. The device of claim 8, wherein the continuing providing the immersive media according to the second metaverse profile includes providing in the immersive media at least a portion of: the first user capabilities, the first content, or a combination thereof.

18. A non-transitory machine-readable medium, comprising executable instructions that, when executed by a processing system including a processor, facilitate performance of operations, the operations comprising:
providing immersive media for presentation by an end user device of a user, wherein the providing the immersive media enables first user capabilities and first content in the immersive media, wherein the providing the immersive media is over a network utilizing a first network slice, a first spectrum resource allocation, and a first Radio Access Technology (RAT);
obtaining a metaverse profile associated with the user, wherein the metaverse profile includes information associated with second user capabilities and second content presentable in the immersive media;
initiating at least one of a second network slice, a second spectrum resource allocation, or a second RAT based on the metaverse profile;
detecting a triggering event associated with the immersive media, wherein the initiating is prior to the detecting of the triggering event;
continuing providing the immersive media for presentation by the end user device, wherein the continuing providing the immersive media is according to the metaverse profile responsive to the triggering event, wherein the continuing providing the immersive media is over the network utilizing the at least one of the second network slice, the second spectrum resource allocation, or the second RAT;
monitoring one of user actions, user interactions, or both user actions and interactions of the user with the immersive media to obtain monitored activity; and
applying a machine learning model to the monitored activity to detect the triggering event and to detect a transition event in the immersive media, wherein the immersive media is one of virtual reality or augmented reality, and wherein the obtaining the metaverse profile is in response to the transition event.

19. The non-transitory machine-readable medium of claim 18, wherein the obtaining of the metaverse profile comprises:
selecting a plurality of metaverse profiles from a group of metaverse profiles of the user, wherein the group of metaverse profiles is generated prior to the providing of the immersive media; and
generating the metaverse profile based on a portion of user capabilities and a portion of content defined in the plurality of metaverse profiles.

20. The non-transitory machine-readable medium of claim 19, wherein a selection of the portion of the user capabilities and the portion of the content of the plurality of metaverse profiles is based on the monitoring of the user actions and the user interactions.

* * * * *